United States Patent

[11] 3,574,901

| [72] | Inventor | Carlos Capella Nogue<br>Calle Roman Macaya 18, Barcelona 6, Spain |
|---|---|---|
| [21] | Appl. No. | 857,918 |
| [22] | Filed | Sept. 15, 1969 |
| [45] | Patented | Apr. 13, 1971 |
| [32] | Priority | Sept. 17, 1968 |
| [33] | | Spain |
| [31] | | 358,568 |

[54] FASTENER FOR ORNAMENTS
5 Claims, 4 Drawing Figs.

[52] U.S. Cl. .................................................. 24/217
[51] Int. Cl. .................................................. A44b 17/00
[50] Field of Search .......................................... 24/208 (A), 217

[56] References Cited
UNITED STATES PATENTS
2,439,000   4/1948   Hasenzahl .................... 24/217
3,367,340   2/1968   David et al. ................... 24/217UX

*Primary Examiner*—Donald A. Griffin
*Attorney*—Christen and Sabol

ABSTRACT: A fastener for attaching ornaments to elastic articles, such as a bathing cap, includes a flanged stud received in a blind aperture in the elastic body having an internal cavity for the flange with a rigid washer adhesively secured to the body surrounding the stud to prevent removal thereof, and an elastic washer to hold an ornament on the stud's projecting stem.

Patented April 13, 1971 3,574,901

FASTENER FOR ORNAMENTS

The present application relates to improvements in the systems for fastening ornaments placed on bathing caps and other objects made of rubber, of the type which have in their wall blind apertures equal in number to the number of ornaments which are to be applied, each of said blind apertures being equipped with lower enlargement like a circular cavity having a small height.

Ornaments are very often applied on bathing caps, beach hats, etc., for example flowers, leaves, petals, feathers and others, in such a manner that they project out of the cap and remain partially loose.

These superposed ornaments are generally affixed by means of glue, this being effected by dissolution of rubber or other glue. Such glueing, however, has the disadvantage that it requires much labor and much time, and as a result is very costly, since it is necessary to support each ornament applied on the cap until the glue is dry. If this is not done, there is a risk that the ornament will shift or fall off.

In the caps which have some blind apertures formed in their wall, the ornaments are affixed in said apertures by means of inserting means, but in the systems known heretofore, the fastening obtained is not very secure and the ornaments may fall off easily, in addition to the fact that the assembling also requires much labor and time.

The disadvantages mentioned above are completely eliminated by the improvements which constitute the object of the present invention, and a strong fastening of these ornaments is obtained through a rapid and simple process.

Essentially, the improvements in question are characterized in that each of said blind apertures is made in the center of a protuberance which is integral with the wall of the cap, and a part composed of a cylindrical stem ending in a disc-shaped flange is inserted in said aperture, said part being made so as to remain nested in the circular cavity of the blind aperture, a washer ring of a nonelastic material being then applied over the upper portion of the respective protuberance so that it remains firmly attached, causes the protuberance to loose its elasticity and prevents the part inserted therein to come out, then placing over said glued washer an ornament provided with a hole in its center so that the above mentioned cylindrical stem may pass therethrough, and finally placing on the latter stem an upper washer, of little elasticity, and adapted so as to prevent the ornament from being detached.

According to another characteristic of the present invention, the above mentioned stem is provided with a tapered top to facilitate the placing of the washers and of the ornament mentioned above, and a circumferential groove, adapted to receive the upper washer of little elasticity, is placed below said tapered top.

Other characteristics and advantages shall be brought out from the following description which is given with reference to the attached drawings illustrating, as a nonlimiting example, an embodiment of the invention.

Figure 1:
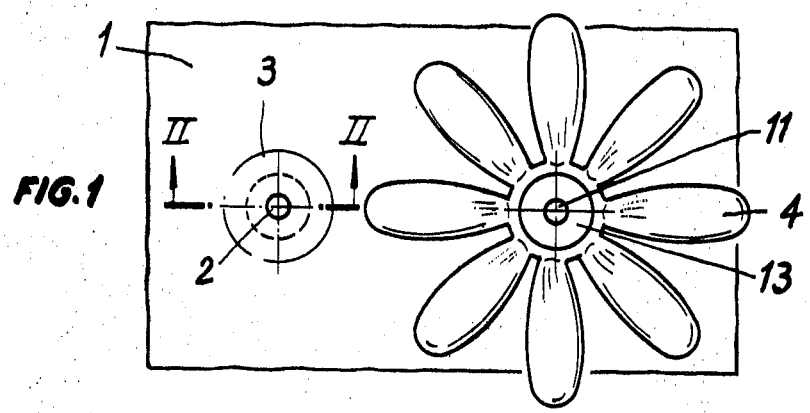
FIG. 1 shows a plan view of a portion of the surface of an object made of rubber, in which can be seen two protuberances, one of which is provided with its corresponding ornament in accordance with a preferred form of the invention.
Figure 2:
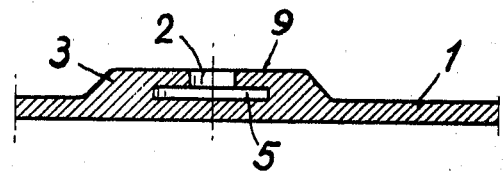
FIG. 2 is a view of a portion of the surface of an object made of rubber, on a larger scale, cut along a plane axial to the blind aperture of the protuberance, i.e., along line II–II of FIG. 1.

In the above FIGS., 1 designates the wall of an object made of rubber, or other suitable elastic material, 2 the above mentioned blind apertures, 3 the protuberances which are integral with the wall 1 of the molded object and in which are formed the apertures 2, and 4 designates an ornament, such may be an object resembling the petals of a flower.

Each one of said blind apertures 2 is provided with a lower enlargement or widening 5 which is a circular cavity and is adapted to receive a stud 6, having a cylindrical stem 7 ending in a disc-shaped flange 8 which will be housed in cavity 5.

Once stud 6 is inserted in its housing, a washer 10 of nonelastic material is affixed by means of glue over the upper face 9 of protuberance 3, with the result that said part 6 is permanently imprisoned in its housing, without any possibility of being detached or removed from the surface of the molded object.

Figure 3:
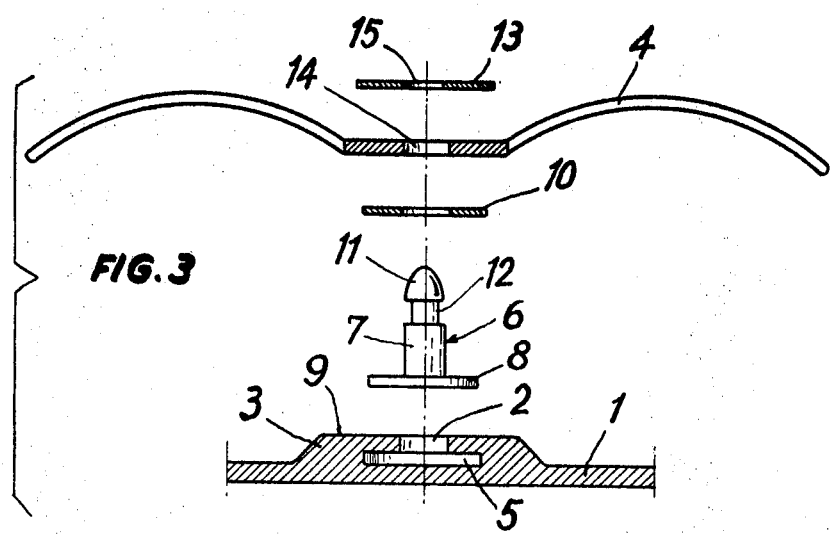
FIG. 3 is an exploded view of a set of parts corresponding to an ornament, also on a larger scale and in a sectional view, said parts being arranged in their correlative position of insertion.
Figure 4:
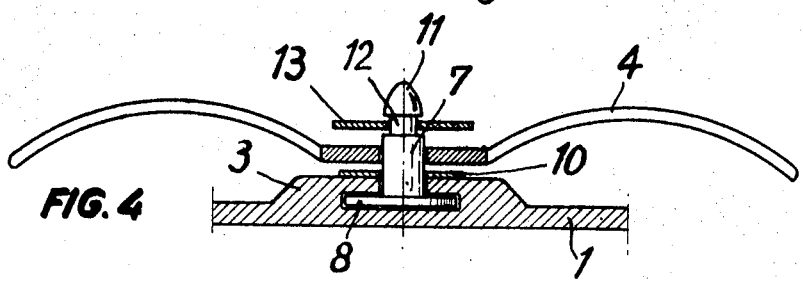
FIG. 4 shows a view similar to that of FIG. 3, but with all of the elements in their attached positions.

Stud 6 is equipped with a tapered top 11, under which is placed a circumferential groove 12 which is adapted to receive a washer 13. Between the two washers 10 and 13 is placed the ornament 4, provided in its center with a hole 14 through which is inserted stem 7, said part 4 being prevented from coming out of its inserted position, illustrated in FIG. 4, by the washer 13 inserted in groove 12. As can be seen in FIGS. 3 and 4, the aperture 15 of washer 13 is of smaller diameter than that of portions 11 and 7 of stud 6, and the washer itself is fabricated from a material having sufficient elasticity to permit expansion of the aperture 15 when pushed over the top 11 and subsequent contraction into the groove 12.

Having described the nature of the invention, as well as the way to put it into practice, it is evident that as long as there is no alteration, change or modification of its basic principle, detailed variations may be made in the invention, the essence of the invention being summarized in the following claims:

I claim:

1. In fasteners for attaching an ornament to the surface of a body made of elastic material, said ornament including a portion provided with an aperture extending therethrough, the combination including a stud provided with a stem and a disc-shaped radial flange portion, said body being provided with a blind aperture having an internal radially extending cavity, said flange portion of the stud being received within said cavity and said stem portion projecting outwardly from the blind aperture, a rigid washer mounted on said stem and adhesively secured to a portion of the surface of said body surrounding the blind aperture, said ornament being mounted on said stem portion above said rigid washer, and an elastic washer mounted on the stem portion to retain said ornament in place by gripping engagement with said stem portion.

2. The invention defined in claim 1, wherein said body of elastic material is provided with a surface protuberance surrounding said blind aperture.

3. The invention defined in claim 1, wherein the central opening in said elastic washer is smaller than the cross section of said stem portion, and the extremity of the stem portion is tapered to facilitate mounting of the elastic washer.

4. The invention defined in claim 1, wherein the central opening in the elastic washer is smaller than the diameter of said stem portion, said stem portion being provided with a medially disposed circumferential groove into which said elastic washer is received.

5. The invention defined in claim 4, wherein the extremity of the stem portion is tapered to facilitate mounting of the elastic washer.